Patented Aug. 10, 1926.

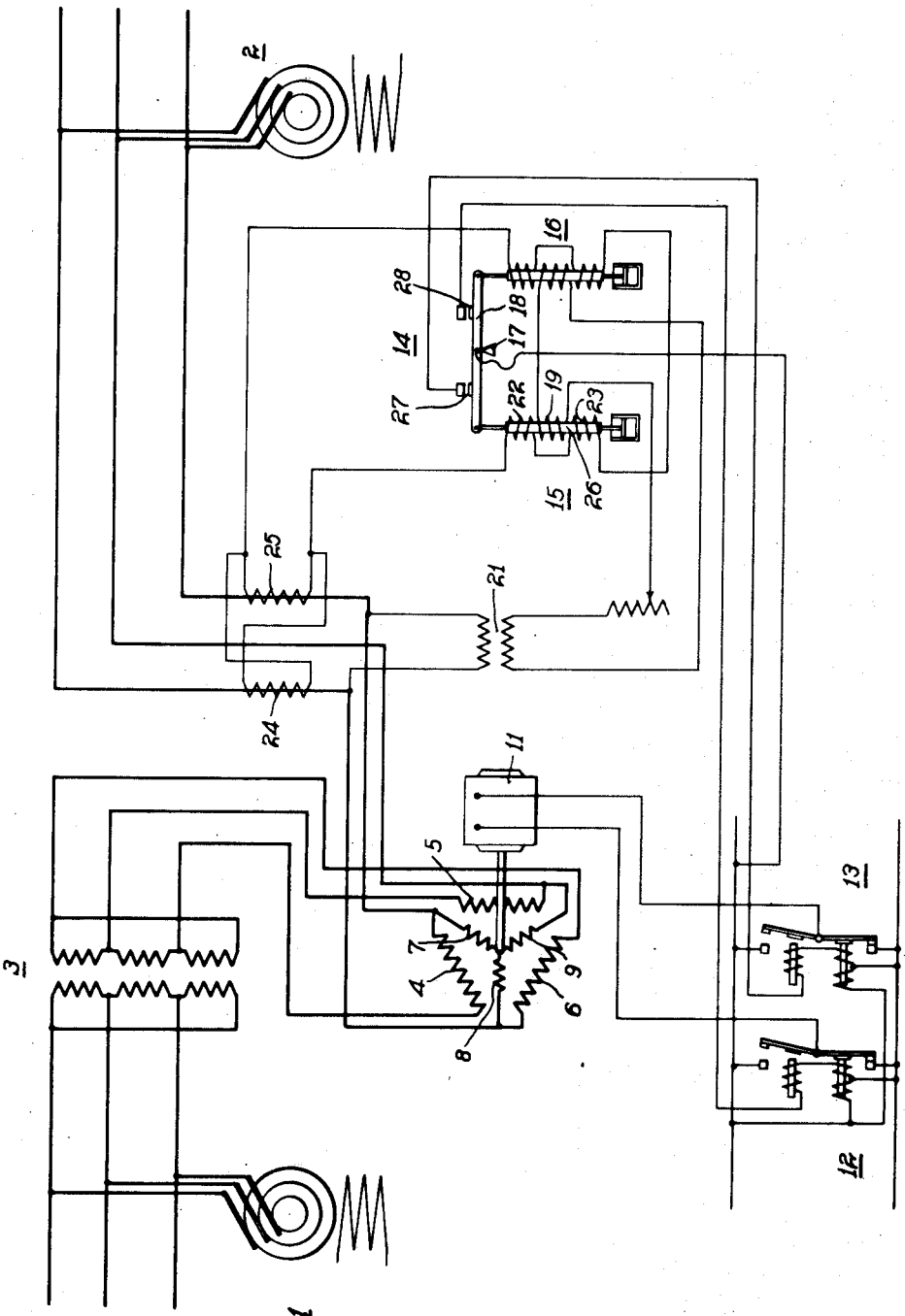

1,595,736

UNITED STATES PATENT OFFICE.

HOLLIS K. SELS, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed March 15, 1923. Serial No. 625,413.

My invention relates to regulator systems, and it has special relation to systems of power-factor regulation.

One object of my invention is to provide a regulator system of the above-indicated character that shall effectively control the power-factor of a circuit between two sources of supply that are connected together.

Another object of my invention is to provide a regulator system of the above-indicated character that comprises an induction regulator, the action of which is governed by a power-factor regulator connected to the circuit to be regulated.

In power systems that comprise two or more generating stations having different operating voltages, it is ordinarily desirable to connect the two stations together through some arrangement of transformers. It has been discovered that by regulating the voltage of one side of the transformer, the power-factor of the circuit between stations may be suitably governed.

My invention contemplates providing means for controlling the power factor of the load exchanged between two power systems. In practicing the invention I make use of an induction voltage regulator connected to the tie circuit. This control of the voltage determines the power factor of the load in the tie circuit, or the exchange of the reactive kilo-volt-amperes between the two stations.

For a better understanding of my invention, reference may be had to the accompanying diagrammatic drawing the single figure of which shows a plurality of sources of supply indicated as generating stations 1 and 2 that are adapted to be connected together through a transformer 3. A polyphase induction regulator, comprising current windings 4, 5 and 6 and potential windings 7, 8 and 9, is connected in the circuit of the transformer 3 between the two stations. One set of the windings of the induction regulator is adapted to be moved by means of a motor 11, the operation of which is controlled by reversing switches 12 and 13 in a well-known manner.

The action of the reversing switches 12 and 13 is governed by a power-factor regulator 14, which comprises electromagnets 15 and 16, respectively connected on opposite sides of the pivot 17 of lever 18. The electromagnets 15 and 16 are similar in construction and respectively comprise a centrally located polarizing winding 19, which is energized from the potential transformer 21, and opposing current windings 22 and 23. These current windings are located on opposite sides of the polarizing winding 19, and are energized from cross-connected series transformers 24 and 25. The winding 19, 22 and 23 co-operate with a single core armature 26.

The magnetic fluxes of the coils 22 and 23 are displaced 180 electrical degrees from each other. The magnetic flux of the coil 19 is normally 90 electrical degrees from the flux of the two current coils, leading with respect to one and lagging with respect to the other. Under this condition the coil 19 and also the coils 22 and 23 tend to hold the core in a central position. A variation from this condition causes the flux from the coil 19 to co-operate with the flux produced by the coils 22 and 23 to move the core in one direction or the other direction.

In transmitting power from one station to the other, it is necessary for the induction regulator to "boost" the voltage when power is transmitted in one direction, and to "buck" the voltage when power is transmitted in the opposite direction. The regulator automatically maintains the power factor constant for transmission of power in either direction. The regulator may be set to hold different values of power-factor by adjusting the phase relation of the voltage and current in the regulator coils. The herein described power-factor regulator 14 is so arranged that when it is desirable to "boost" the voltage of the circuit, the energization of the electromagnets will be so varied as to cause engagement of the contact members 27 to energize the reversing switch 13 and operate the induction-regulator motor 11 in the proper direction to boost the voltage of the circuit. As the power-factor of the circuit returns to normal unitary value, or to whatever value is being maintained, the contact members 27 will be separated, which will deenergize the reversing switch 13 and in turn, the regulator motor 11.

Similarly, if the condition of the circuit is such that the voltage transmitted should be "bucked" down, the electromagnets will function to cause engagement of the contact members 28 to energize reversing switch 12 and operate the induction-regulator motor 11 in the opposite direction. As the power-factor of the circuit returns to the normal value being maintained, the contact members 28 will be separated to deenergize the reversing switch 12 and the motor 11.

Accordingly, the regulator system herein described functions to automatically control the power-factor in case of transmission of power in either direction between the stations 1 and 2.

Modifications in the system and arrangement and location of parts may be made within the spirit and scope of my invention and such modifications are intended to be covered by the appended claims.

I claim as my invention:

1. In an electrical system, the combination with two sources of supply and means for connecting the same together, of regulating means for maintaining the power-factor of the circuit therebetween substantially constant.

2. In an electrical system, the combination with two sources of supply and means for connecting the same together, of regulating means for maintaining the power-factor of the circuit therebetween substantially constant, said regulating means comprising an induction regulator and means operating in accordance with the power-factor of said circuit to control the operation of said induction regulator.

3. In an electrical system, the combination with two sources of supply and means for connecting the same together, of regulating means for maintaining the power-factor of the circuit therebetween substantially constant, said regulating means comprising an induction regulator and means operating in accordance with the power-factor of said circuit to cause the operation of said induction regulator to buck or boost the voltage of said circuit.

4. In an electrical system, the combination with two sources of supply and means for connecting the same together, of regulating means for controlling the exchange of reactive current between said sources of supply.

5. In an electrical system, the combination with two sources of supply and means for connecting the same to one power circuit, of regulating means for controlling the power-factor of said circuit, said regulating means comprising an induction regulator, a motor for operating the same, reversing means for said motor and electromagnetic means operating in accordance with the power-factor of said circuit for governing the operation of said reversing means.

6. In an electrical system, the combination with two sources of supply and means for connecting the same to one power circuit, of regulating means for controlling the power-factor of said circuit, said regulating means comprising an induction regulator, a motor for operating the same, reversing means for said motor and means operating in accordance with the power-factor of said circuit for governing the operation of said reversing means, and comprising a single armature having a plurality of windings co-operating therewith and energized in accordance with the voltage and the current of said circuit.

7. In an electrical system, the combination with two sources of supply and means for connecting the same to one power circuit, of regulating means adapted to control the power-factor of said circuit, said regulating means comprising an induction regulator, a motor for operating the same, reversing means for said motor and electromagnetic means comprising a pivoted lever, two electromagnets disposed on opposite ends thereof, and contact members controlled by the operation of said lever, said electromagnets each comprising a plurality of windings energized in accordance with the voltage and the current of said circuit.

8. In an electrical system, the combination with two sources of supply and means for connecting the same together, of regulator means for maintaining the power-factor of the circuit therebetween substantially constant, said means being sensitive to the direction of power flow through said circuit.

9. In an electrical system, the combination with two sources of supply and means for connecting the same together, of regulator means for maintaining the power-factor of the circuit therebetween substantially constant, said regulating means comprising an induction regulator and means operated in accordance with the power-factor of said circuit to control the operation of said induction regulator, said last named means being sensitive to the direction of power flow through said circuit.

In testimony whereof, I have hereunto subscribed my name this twenty-seventh day of February, 1923.

HOLLIS K. SELS.